United States Patent [19]

Thompson et al.

[11] 4,384,700
[45] May 24, 1983

[54] VELOCITY SENSITIVE SEAT DAMPER SYSTEM

[75] Inventors: James E. Thompson; Howard T. Uehle, both of Cedar Falls, Iowa

[73] Assignee: Deere & Company, Moline, Ill.

[21] Appl. No.: 195,861

[22] Filed: Oct. 10, 1980

[51] Int. Cl.³ .......................................... F16M 13/00
[52] U.S. Cl. .................................. 248/550; 248/562; 248/636
[58] Field of Search ............... 248/566, 550, 562, 636, 248/631; 188/299; 267/117, 131

[56] References Cited

U.S. PATENT DOCUMENTS

| | | | |
|---|---|---|---|
| 3,265,345 | 8/1966 | Vuichard | 248/566 |
| 3,371,685 | 3/1968 | Tilney | 251/120 X |
| 3,470,692 | 10/1969 | Kamp | 60/51 |
| 3,486,417 | 12/1969 | Vita et al. | 91/216 |
| 3,599,956 | 8/1971 | Harder et al. | 267/120 |
| 3,632,077 | 1/1972 | Hall | 248/566 |
| 3,712,603 | 1/1973 | Hickinbotham | 267/131 |
| 3,912,248 | 10/1975 | Pickford et al. | 267/131 |
| 3,938,770 | 2/1976 | Turner et al. | 248/400 |
| 3,990,668 | 11/1976 | Thompson | 248/550 |
| 4,215,842 | 8/1980 | Brenner | 248/562 |

*Primary Examiner*—J. Franklin Foss

*Attorney, Agent, or Firm*—Fraser and Bogucki

[57] ABSTRACT

A seat suspension system, which includes a height adjustment valve for positioning a seat at a desired height in response to manual positioning of a height adjustment lever by controlling the amount of hydraulic fluid supplied to a cylinder having a piston therein coupled to the seat, provides damping of vertical motion of the seat by an accumulator coupled to the cylinder via a conduit so as to receive the hydraulic fluid from the cylinder and two different valves disposed in the conduit. A manually adjustable flow control valve has an adjustable orifice within the conduit for providing the seat with a nominal amount of damping. The damping of the suspension system is increased beyond the nominal amount in response to seat velocity in a downward direction by the second valve which responds to the pressure of hydraulic fluid flowing from the cylinder to the accumulator so as to restrict the flow of the fluid by an amount dependent upon the fluid pressure and thereby the rate of change of downward movement of the seat. At the same time the second valve is generally unresponsive to the pressure of fluid flowing in an opposite direction from the accumulator to the cylinder so as to be unidirectional in nature.

4 Claims, 5 Drawing Figures

VELOCITY SENSITIVE SEAT DAMPER SYSTEM

BACKGROUND OF THE INVENTION

1. Field of the Invention

The present invention relates to seat suspension systems, and more particularly to systems of the type which provide damped movement of the seat in a generally vertical direction to compensate for bumpy and uneven terrain negotiated by a vehicle in which the seat is mounted.

2. History of the Prior Art

It is known to provide seat suspension systems which allow for damped vertical movement of the seat in response to motion of the vehicle in which the seat is mounted. Such suspension systems which may also include apparatus for adjusting the height of the seat are common in off-road vehicles such as tractors where bumps and uneven terrain are commonly encountered and where operator comfort is therefore of considerable importance.

Certain types of seat suspension systems provide the seat with a fixed amount of vertical damping. The damping is vertically adjustable, but once adjusted remains the same despite the occurrence of different terrain and different ride conditions. Where the vehicle operator can see or anticipate relatively rough terrain, the damping control can be adjusted to provide a high level of damping. Such condition is desirable if not necessary when relatively rough terrain and large bumps are being negotiated, but at the same time provides a ride which is unduly harsh and uncomfortable. For this reason when relatively even terrain which is not too bumpy is encountered, the operator typically decreases the amount of damping to soften the vertical suspension of the seat and thereby greatly increase operator comfort.

The difficulty with a fixed damping suspension system lies in the fact that terrain can change abruptly. For example, a relatively smooth road or field being traversed by the vehicle may have one or more large, hidden bumps. If the suspension system is adjusted to provide a low damping, soft ride desired on relatively even and non-bumpy terrain, the sudden encounter of a large bump or series of bumps can cause the seat to undergo substantial vertical movement in response thereto and perhaps even "bottom out" by striking the lower limit of vertical travel thereof. These and other situations often dictate the desirability of a suspension system which provides damping that varies in response to such things as the frequency of seat motion. Many prior art seat suspension systems optimize seat damping at one particular frequency at the expense of far less than optimum ride conditions at other frequencies of seat motion.

Examples of prior art seat suspension systems are provided by U.S. Pat. Nos. 3,265,345 of Vuichard, 3,632,077 of Hall, 3,912,248 of Pickford et al, 3,486,417 of Di Vita et al, 3,599,956 of Harder et al, 3,712,603 of Hickinbotham, 3,470,692 of Kamp and 3,938,770 of Turner et al. The Vuichard patent suggests placing a unidirectional flow restricter of fixed size in the form of the parallel combination of a check valve and a fixed flow regulator between a cylinder which mounts the seat to permit vertical movement thereof and an accumulator, so as to restrict upward seat movement and thereby damp out seat oscillations. The Hall patent describes a similar system in which upward movement or rebound of the seat is slowed by slowing the rate of relaxation of the flow regulator within the suspension system using a restricter and check valve arrangement. The valve arrangement can be reversed to slow downward movement instead of upward movement as pointed out in the Hall disclosure. Hall gets varied damping using flow regulation which requires mechanical linkages in a rather complex arrangement. As in the case of Vuichard damping is directly dependent on the position of the seat rather than on the velocity or changing displacement of the seat.

Accordingly, it would be desirable to provide a seat suspension system in which variable damping is provided as a function of seat velocity or the rate of change of seat displacement. It would furthermore be desirable to provide such a system in which the increased damping is provided in the downward direction only of seat movement. It would furthermore be desirable to provide a system with these capabilities which at the same time is of relatively simple arrangement and which does not require mechanical linkages to accomplish flow regulation.

BRIEF DESCRIPTION OF THE INVENTION

These and other objects are accomplished in accordance with the invention by a seat suspension system having a nominal amount of damping for a given manual setting and which is capable of increasing the damping in response to and as a function of the velocity of downward movement of the seat. The nominal damping is provided by a manually adjustable flow control valve positioned in a conduit between a ride cylinder on which the seat is mounted and an accumulator having an air precharge within a portion thereof. The increased damping in response to seat velocity in the downward direction is provided by a second flow control valve having an orifice which varies in size in response to fluid pressure in the conduit. The valve is responsive to increases in fluid pressure in the direction from the cylinder to the accumulator while being essentially unresponsive to fluid pressure in the opposite direction. In this manner the manually adjustable flow control valve can be adjusted to provide a relatively soft ride in response to the higher frequencies of motion encountered when relatively smooth terrain is negotiated. At the same time the second, fluid pressure responsive flow control valve provides the increased damping desired at lower frequencies of motion approaching the natural frequency of the seat such as may be encountered when a large, sharp bump is suddenly struck.

In a preferred arrangement of a seat suspension system in accordance with the invention the seat is mounted on the piston of a ride cylinder coupled to an accumulator as well as to a height adjustment valve. The height adjustment valve which is coupled to the opposite side of a pressure regulating valve from a source of pressurized hydraulic fluid and which is responsive to a manually operated height adjustment lever provides initial adjustment of the amount of fluid into the cylinder to position the seat at a desired height. Thereafter, the accumulator in conjunction with the two flow control valves mounted within the conduit connecting the accumulator to the cylinder determine the damping for the seat. The manually adjustable flow control valve presents an orifice of predetermined adjustable size within the conduit to provide the suspension system with a nominal amount of damping. The second flow control valve which has an orifice that automatically varies in response to fluid pressure in the direction from the cylinder to the accumulator increases the damping over and above the nominal damping provided by the first valve as a function of the downward velocity or rate of change of downward displacement of the seat.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

DETAILED DESCRIPTION

Figure 1:
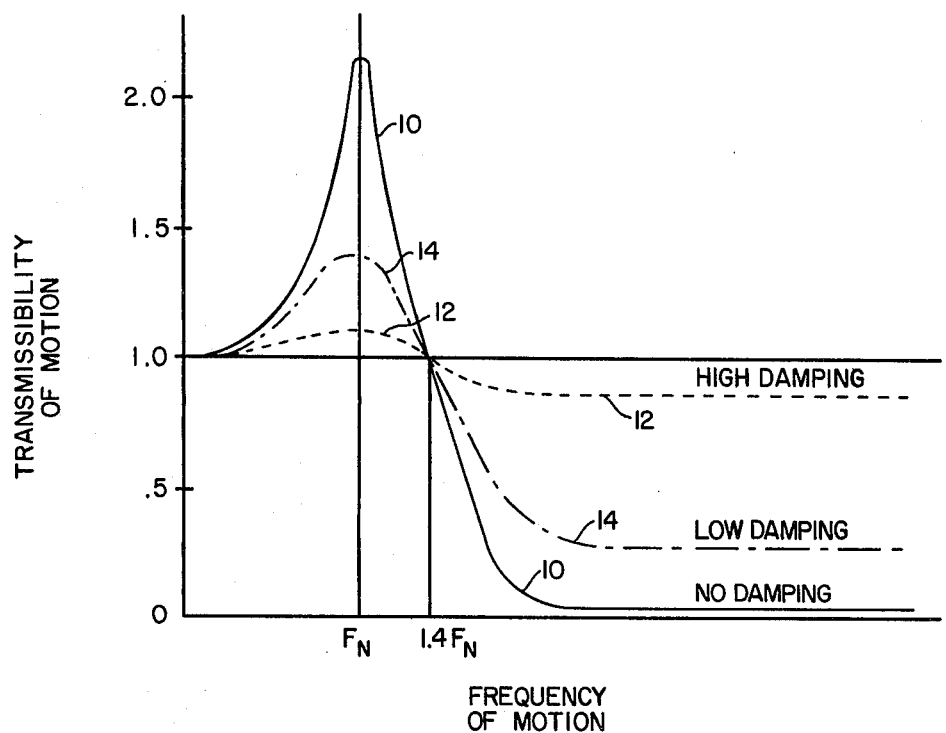
FIG. 1 is a diagrammatic plot of transmissibility of motion as a function of its frequency illustrating the characteristics of seat suspension systems having constant damping.

FIG. 1 is a diagrammatic plot of the transmissibility of motion in a seat suspension system as a function of the frequency of the motion, the transmissibility being plotted along a vertical axis and the frequency being plotted along a horizontal axis. The transmissibility which is the ratio of motion output to input increases in an upward direction from 0 at the horizontal axis through 1.0 to 2.0 as depicted in FIG. 1. The frequency of the motion increases in a direction toward the right from 0 at the vertical axis through a value $F_N$ which represents the natural frequency of the seat suspension system to a value substantially greater than $F_N$.

As previously noted most prior art suspension systems provide a constant amount of damping, such as by use of a shock absorber having an orifice of fixed size. A solid line curve 10 represents the resulting characteristic of motion when such a suspension system is adjusted to provide very little or no damping. It will be seen that at higher frequencies of motion of the type encountered over relatively smooth terrain, the transmissibility approaches the ideal value of 0. However, at frequencies approaching the natural frequency $F_N$ of the suspension system such as occur when a relatively large bump or series of bumps is encountered, the characteristic 10 quickly deteriorates to a point where the transmissibility approaches a value of 2.0 or greater. This represents a relatively uncontrolled ride condition characterized by excessive seat motion due to the lack of sufficient damping.

At the other extreme the seat suspension system may be adjusted to provide high damping, in which event the transmissibility is represented by a dashed curve 12. At or close to the natural frequency $F_N$, the transmissibility remains relatively close to the acceptable value 1.0 at that frequency range. However at higher frequencies well in excess of $F_N$, the transmissibility is only sightly better than 1.0 and far from the ideal value of 0.

Because seat suspension systems having a constant value of damping tend to provide a comfortable, controlled ride at one end of the frequency spectrum but not the other, a compromise is usually sought as represented by a broken line curve 14 in FIG. 1. In this instance the transmissibility at the natural frequency $F_N$ is approximately 1.4 which is not as good as in the case of high damping represented by the dashed curve 12 but far better than in the case of no damping represented by the solid line curve 10. Likewise, at higher frequencies the low damping condition represented by the broken line curve 14 approaches a value of transmissibility which is not as good as the near 0 value achieved by the no damping condition of curve 10 but far better than the transmissibility of almost 1.0 which exists in the high damping condition represented by the dashed curve 12.

It will be seen that the nature of the seat suspension system illustrated in FIG. 1 is such that the transmissibility of the motion passes through a value of 1.0 at a frequency of approximately 1.4 $F_N$ regardless of the damping.

It will also be appreciated that a better ride can be achieved by designing the seat suspension system to have relatively high damping at or close to the natural frequency $F_N$ and relatively low damping at higher frequencies. This is accomplished in accordance with the invention by a seat suspension system which normally provides an adjustable nominal amount of damping and at the same time is capable of increasing the damping as a function of downward seat velocity or rate of change of downward displacement of the seat. This allows the seat suspension system to be adjusted so that the nominal damping is low enough to provide a soft, comfortable ride when the vehicle is traveling over relatively smooth terrain while at the same time quickly and effectively increasing the damping in response to sudden large bumps or other terrain variations at or close to the natural frequency of the suspension system which would otheriwse produce accentuated, uncontrolled seat motion, particularly in the downward direction.

Figure 2:
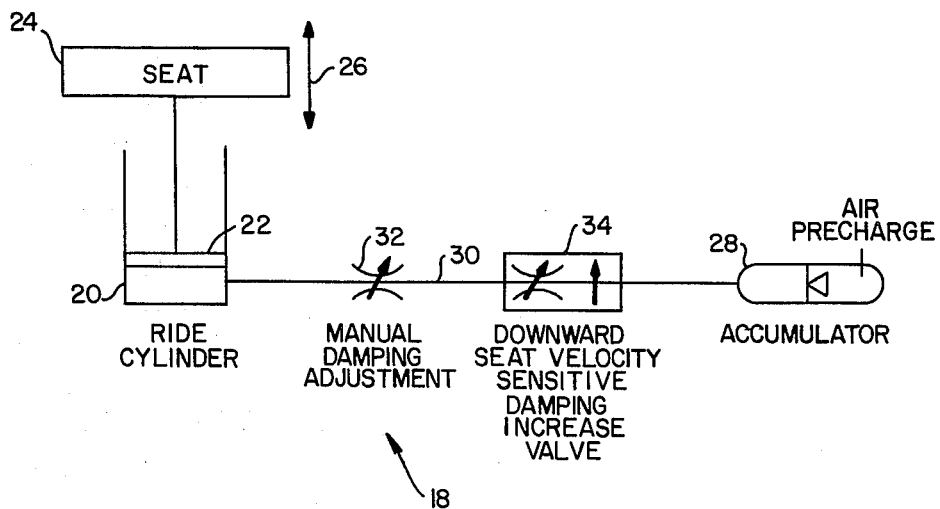
FIG. 2 is a partial block and partial schematic diagram of a seat suspension system in accordance with the invention.

FIG. 2 depicts in partial block and partial schematic form a preferred arrangement of a seat suspension system 18 in accordance with the invention. The seat suspension system 18 includes a ride cylinder 20 having an internal piston 22 capable of generally vertical motion within the cylinder 20. The piston 22 is coupled to a seat 24 such that the seat 24 can also undergo generally vertical motion in conjunction with the piston 22 as denoted by an arrow 26.

The ride cylinder 20 is coupled to an accumulator 28 via a conduit 30. A portion of the accumulator 28 opposite the conduit 30 is precharged with air at a selected pressure. The remainder of the accumulator 28 is filled with hydraulic fluid as is the conduit 30 and the portion of the ride cylinder 20 beneath the piston 22. The accumulator 28 provides damping for the vertical movement of the seat 24. Downward movement of the seat 24 is accompanied by the flow of fluid from the ride cylinder 20 through the conduit 30 to the left end of the accumulator 28 against the resilient resistance provided by the air precharge of the accumulator. Removal of downward force on the seat 24 allows fluid within the accumulator 28 to return to the ride cylinder 20 under the resilient urging of the air precharge and thereby raise the seat 24.

The amount of damping provided by the accumulator 28 is relatively constant and in any event is independent of the frequency of motion of the seat 24. To make this nominal amount of damping adjustable, the seat suspension system 18 is provided with a manual damping adjustment valve 32 coupled in the conduit 30 between the ride cylinder 20 and the accumulator 28. The manual damping adjustment valve 32 may comprise a flow control valve or other appropriate type of valve which may be manually adjusted to vary the flow through the conduit 30. In the case of a flow control valve, such valve has an internal orifice which is variable in size by manual adjustment. When the orifice is at its largest setting the hydraulic fluid is relatively free to flow between the ride cylinder 20 and the accumulator 28. Damping is at a minimum as determined by the accumulator 28. In this condition the seat suspension system 18 tends to behave in the manner shown by the solid line curve 10 in FIG. 1. The transmissibility is close to 0 in value in response to the relatively high frequency motions typically encountered on relatively smooth terrain. However, relatively large bumps and other conditions causing motion at or close to the natural frequency $F_N$ result in the relatively high values of transmissibility which characterize substantial, generally uncontrolled seat motion. At the other extreme where the valve 32 is adjusted to provide an orifice of minimum size, the flow of hydraulic fluid between the ride cylinder 20 and the accumulator 28 is substantially restricted, providing a high damping condition similar to that represented by the dashed line curve 12 in FIG. 1. Such high damping setting is ideal for relatively bumpy and uneven terrain where much of the motion occurs at or relatively close to the natural frequency $F_N$. At higher frequencies this high damping setting produces a relatively harsh and uncomfortable ride as previously noted.

In accordance with the invention the damping of the seat suspension system 18 of FIG. 2 is increased over the nominal value provided by the manual damping adjustment valve 32 in response to downward motion of the seat 24 at or close to the natural frequency of the seat suspension system 18 by providing a downward seat velocity sensitive damping increase valve 34. The valve 34 which is coupled in the conduit 30 between the ride cylinder 20 and the accumulator 28 has no effect on the flow of hydraulic fluid from the accumulator 28 to the ride cylinder 20. By the same token, the valve 34 has an internal orifice which decreases in size in direct proportion to the pressure of hydraulic fluid flowing from the ride cylinder 20 to the accumulator 28. This has the effect of varying the orifice size of the valve 34 and thereby the damping provided thereby in accordance with the velocity of the seat 24, and more specifically the rate of change of downward displacement of the seat 24. The faster the seat 24 moves in the downward direction, the greater is the pressure of hydraulic fluid flowing from the ride cylinder 20 to the accumulator 28 and thereby the smaller the orifice of the valve 34. This has the effect of increasing damping above the nominal value provided by the manual damping adjustment valve 32. The resulting transmissibility characteristic for the seat suspension system 18 resembles that of the dashed curve 12 at frequencies at or close to $F_N$ and the solid line curve 10 at frequencies above 1.4 $F_N$.

Figure 3:
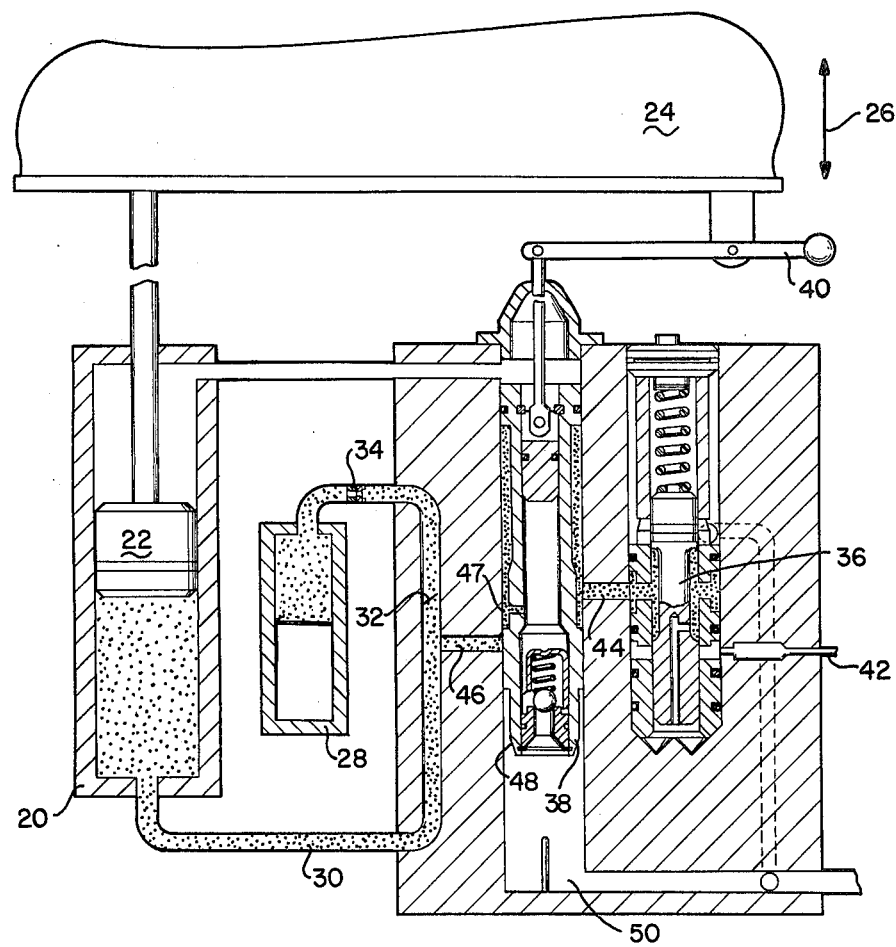
FIG. 3 is a cross-sectional view of a detailed example of the seat suspension system of FIG. 2.

A detailed example of the seat suspension system 18 of FIG. 2 is shown in cross-section in FIG. 3 where the various components corresponding to those of FIG. 2 are identified by the same reference numerals. In addition to the components shown in FIG. 2, the arrangement of FIG. 3 includes a pressure regulating valve 36, a height adjustment valve 38 and a height adjustment lever 40. The pressure regulating valve 36 is coupled to a source 42 of pressurized hydraulic fluid and regulates the pressure of fluid from the source so as to provide the hydraulic fluid at a desired pressure via a conduit 44 to the height adjustment valve 38. The height adjustment valve 38 responds to the height adjustment lever 40 by varying the amount of hydraulic fluid passed via the conduit 44 and a conduit 46 to the main conduit 30. When the height adjustment lever 40 is pulled up to raise the seat 24, the height adjustment valve 38 is forced downwardly to a point where the hydraulic fluid in the conduit 44 is able to flow through a land 47 and through the conduit 46 to the ride cylinder 20 via the main conduit 30. As the seat 24 travels upward in response to upward movement of the piston 22 in response to the flow of fluid into the ride cylinder 20, the height adjustment valve 38 is also pulled upwardly by the seat 24. When the seat 24 reaches the desired vertical position, the land 47 is cut off from the conduit 46 so as to cut off the conduit 46 from the conduit 44.

When the height adjustment lever 40 is pushed down to lower the seat 24, the height adjustment valve 38 is pulled up until a land 48 at the bottom thereof reaches the conduit 46. The land 48 allows fluid from the main conduit 30 to flow through the conduit 46 and to the land 48 where it discharges through a passage 50 to a sump (not shown). As the seat 24 moves downward in response to the sumping of hydraulic fluid from the main conduit 30 and the resulting diminishing volume of fluid in the ride cylinder 20, the height adjustment valve 38 is also pushed downwardly. When the seat 24 reaches the desired vertical position, the height adjustment valve 38 is positioned to cut off the conduit 46 from the land 48 and thereby the discharge passage 50.

Except when the height adjustment lever 40 is pulled up or pushed down to raise or lower the seat 24 respectively, the height adjustment valve 38 tends to remain at or close to a nominal position in which the conduit 46 is effectively cut off from both the conduit 44 and the passage 50. A large amount of downward movement of the seat 24 results in downward movement of the height adjustment valve 38 to the extent that the land 47 admits some pressurized fluid to the conduit 46. This additional fluid joins the flow of fluid from the ride cylinder 20 to the accumulator 28 via the valves 32 and 34. Conversely, a large amount of upward movement of the seat 24 results in upward movement of the height adjustment valve 38 to the extent that the land 48 provides some venting of the conduit 46 to the passage 50.

The manual damping adjustment valve 32 can comprise a pivotable vane within the conduit 30 or any other adjustable flow regulating valve for presenting an orifice of adjustable size within the conduit 30 as previously described.

Figures 4A, 4B:
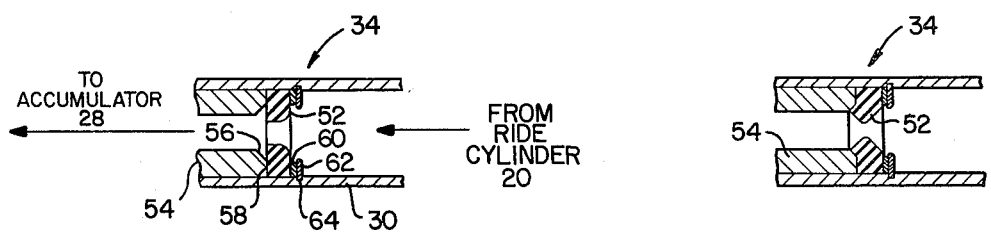
FIG. 4A is a sectional view of a fluid pressure responsive flow control valve used in the arrangement of FIG. 3.
FIG. 4B is a sectional view similar to that of FIG. 4A but illustrating the manner in which a portion of the valve deforms in response to fluid pressure.

An example of the downward seat velocity sensitive damping increase valve 34 is shown in FIGS. 4A and 4B. As shown the valve 34 comprises a type of flow control valve having an internal orifice which varies in size in response to fluid pressure in a given direction. Specifically, the valve 34 includes a generally ring-shaped diaphragm 52 disposed within the inner wall of the conduit 30 and against an annular shoulder 54. The annular shoulder 54 has a beveled inner edge portion 56 and a relatively flat outer edge portion 58 against which the diaphragm 52 is normally seated by a flat washer 60 and a snap ring 62 which seats with a small annular groove 64 in the inner wall of the conduit 30.

The valve 34 is generally unresponsive to the pressure of fluid flowing from the accumulator 28 to the ride cylinder 20 (in a direction from left to right as viewed in FIG. 4A). However, the valve 34 does respond to the pressure of fluid flowing from the ride cylinder 20 to the accumulator 28 (from right to left as viewed in FIG. 4A). The resulting deformation of the diaphragm 52 in response to this unidirectional fluid pressure is illustrated in FIG. 4B. The greater the fluid pressure, the greater the deformation of the diaphragm 52 and the smaller the annular opening at the center of the diaphragm 52. FIG. 4A depicts the condition when the diaphragm 52 is not deformed by fluid pressure and the central aperture through the diaphragm 52 is therefore of maximum size. In this condition the seat suspension system 18 operates with the nominal amount of damping provided by the manual damping adjustment valve 32. As the diaphragm 52 begins to deform onto the beveled inner edge portion 56 in response to fluid pressure, the orifice defined by the central aperture through the diaphragm 52 begins to diminish in size as shown in FIG. 4B. The greater the fluid pressure, the greater is the deformation and the smaller is the resulting orifice defined by the central aperture of the diaphragm 52. When this condition occurs increased damping over the nominal value provided by the valve 32 is provided by the valve 34.

Thus, it will be seen that seat suspension systems in accordance with the invention are provided with a nominal amount of damping for relatively high frequency motion and at the same time have increased damping as a function of downward velocity of the seat. The increased damping does not occur until the rate of change of displacement of the seat in the downward direction reaches the threshold value at which the resulting fluid pressure within the conduit 30 causes the downward seat velocity sensitive damping increase valve 34 to begin deforming. The greater the increase in downward seat velocity above this threshold value, the greater is the valve deformation and thereby the smaller the orifice of the valve. This has the effect of increasing the damping of the seat suspension system at lower frequencies at or close to the natural frequency $F_N$.

While the invention has been particularly shown and described with reference to preferred embodiments thereof, it will be understood by those skilled in the art that various changes in form and details may be made therein without departing from the spirit and scope of the invention.

What is claimed is:

1. A seat suspension system comprising the combination of:
   means for mounting a seat at a nominal height and including means for permitting movement of the seat in a generally vertical direction, the means for permitting movement including a cylinder having a piston coupled to and extending downwardly from and supporting the seat;
   means for providing a nominal amount of damping of the seat when undergoing movement in a generally vertical direction and including an accumulator and a conduit coupling the accumulator to the cylinder; and
   means responsive to the velocity of movement of the seat in a generally vertical direction for increasing the damping of the seat above the nominal amount by an amount determined by the velocity of movement of the seat, the means for increasing the damping operating only when the seat is moving in a downward direction and comprising means for adjusting the cross-sectional size of a portion of the conduit as a function of fluid pressure in the conduit, the means for adjusting the cross-sectional size of a portion of the conduit as a function of fluid pressure in the conduit being responsive only to fluid pressure in a direction from the cylinder to the accumulator.

2. In a seat suspension system in which a cylinder having a piston coupled to and supporting a seat is directly coupled via a fluid conduit to an accumulator, the improvement comprising a valve coupled in the fluid conduit between the cylinder and the accumulator, the valve being operative to restrict fluid flow in the conduit by an amount dependent on the pressure of fluid flowing in the conduit from the cylinder to the accumulator and comprising means for adjusting the cross-sectional size of a portion of the conduit as a function of fluid pressure in the conduit, the valve being generally unresponsive to the pressure of fluid flowing in the conduit from the accumulator to the cylinder.

3. A seat suspension system comprising the combination of:
   a seat;
   a first device containing fluid and continuously coupled to the seat, the fluid being driven from the first device in response to generally downward movement of the seat;
   a second device coupled to receive fluid from the first device;
   means for limiting the flow rate of fluid between the first device and the second device to an adjustable value determining a nominal amount of damping for the seat; and
   means for further limiting the flow rate of fluid between the first device and the second device beyond the adjustable value by an amount dependent on the rate of increase of generally downward movement of the seat;
   the first device comprising a cylinder, the second device comprising a precharged accumulator, the means for limiting comprising a manually adjustable flow control valve and the means for further limiting comprising a second flow control valve having an orifice which varies in size responsive to the pressure of fluid flow in a direction from the cylinder to the accumulator.

4. A seat suspension system comprising the combination of:
   a cylinder having a piston disposed for generally vertical movement therein;
   a seat mounted on the piston of the cylinder;
   an accumulator;
   a conduit coupled between the cylinder and the accumulator;
   a height adjustment valve coupled to the conduit between the cylinder and the accumulator;
   a height adjustment control coupled to the height adjustment valve;
   a source of pressurized fluid;
   a pressure regulating valve coupling the source of pressurized fluid to the height adjustment valve;
   a manually adjustable flow control valve coupled in the conduit between the accumulator and the location in the conduit where the height adjustment valve is coupled to the conduit; and a fluid pressure responsive flow control valve coupled in the conduit between the accumulator and the location in the conduit where the height adjustment valve is coupled to the conduit, the fluid pressure responsive flow control valve being responsive to the pressure of fluid flowing in a direction from the cylinder to the accumulator to vary fluid flow in the direction from the cylinder to the accumulator in accordance with the pressure and not being responsive to the pressure of fluid flowing in an opposite direction from the accumulator to the cylinder.

* * * * *